3,272,723
PURIFICATION OF XYLENES FROM STYRENE BY DISTILLATION IN THE PRESENCE OF COMBINED AZEOTROPING AGENT AND SOLVENT ADDITIVE
Loyd W. Fannin, Bridgeton, Mo., assignor to Monsanto Company, a corporation of Delaware
No Drawing. Filed Oct. 24, 1962, Ser. No. 232,858
8 Claims. (Cl. 203—51)

The present invention relates to the separation and purification of alkyl aromatic hydrocarbons. More particularly, the present invention relates to the separation of vinyl aromatic hydrocarbons, i.e. styrene, from alkyl aromatic hydrocarbons, i.e., xylenes and ethylbenzene.

Vinyl aromatic hydrocarbons as used herein refers to aromatic hydrocarbons containing a mono-ethylenically unsaturated aliphatic substituent, e.g., styrene. Alkyl aromatic hydrocarbons refers to those aromatic hydrocarbons having saturated aliphatic substituents, e.g. xylenes, ethylbenzene and the like.

In the dehydrogenation of mixed alkyl benzene streams containing both xylenes and ethylbenzene to produce styrene, the product stream contains relatively large amounts of the xylenes as well as product styrene and unreacted ethylbenzene. By fractionation, the product stream may be divided into a styrene product stream containing some o-xylene and other products, an o-xylene stream containing styrene, other xylenes and ethylbenzene as impurities and an ethylbenzene stream containing m- and p-xylene as well as small amounts of o-xylene and styrene as impurities. The styrene stream may be subjected to further fractionation or other purification means to obtain high purity styrene. The latter stream is, of course, usable as recycle to the dehydrogenation zone. In many instances, however, it is necessary or at least desirable to remove the last traces of styrene from this stream to prevent fouling of the reactor and catalyst. Often, the styrene cannot be removed economically because of the distillation efficiency required to remove the styrene. The o-xylene stream must be sold or otherwise disposed of for whatever value may be obtained from it. Its value for many uses is decreased by the presence of the styrene. Further fractionation of this stream, because of the extremely high distillation efficiency necessary to remove the majority of the remaining styrene, is generally too costly. There is a need, therefore, for additional, more economical means of separating the styrene impurity from both the o-xylene fraction and the recycle ethylbenzene fraction.

It is, therefore, an object of the present invention to provide a process for the purification of alkylbenzenes. A further object of the present invention is to provide a process for the separation of alkyl aromatic hydrocarbons from vinyl aromatic hydrocarbons. A particular object of the present invention is to provide a process for the separation of a vinyl aromatic hydrocarbon of 8 carbon atoms from alkyl aromatic hydrocarbons of 8 carbon atoms. Another and more particular object of the present invention is to provide a process for the purification of xylenes. Yet another particular object of the present invention is to provide a process for the separation of xylenes from styrene. A further particular object of the present invention is to provide a process for the purification of o-xylene containing relatively small amounts of styrene as an impurity. Additional objects will become apparent from the following description of the invention herein disclosed.

In fulfillment of these and other objects, it has been found that a mixture of vinyl aromatic hydrocarbons and alkyl aromatic hydrocarbons can be separated by distillation in the presence of a liquid capable of forming an azeotrope with the alkyl aromatic hydrocarbons containing a salt of a metal from Group II–B of the periodic table dissolved therein. The azeotroping agent and alkyl aromatic hydrocarbons are removed overhead in the distillation while the vinyl aromatic hydrocarbons and metal salt are removed as bottoms from the distillation. The alkyl aromatic hydrocarbons are readily recovered from the azeotroping agent by phase separation, solvent extraction or the like. This process considerably simplifies the distillation necessary to obtain separation and purification of relatively close boiling mixtures of alkyl aromatic hydrocarbons and vinyl aromatic hydrocarbons.

In order to further describe and to demonstrate the efficacy of the present invention, the following examples are presented. These examples are not, however, to be construed as limiting to the present invention, but merely exemplary of the results obtainable from a particular mode of practice.

*Example I*

A mixture of equal parts by volume of styrene and o-xylene was refluxed for 1 hour in the presence of mixtures of mercuric acetate and various o-xylene azeotroping agents. The mixtures, conditions and results are presented in the following table. The amount of azeotroping agent used in each distillation was 80 mls. A ratio of 4 parts by volume of the azeotroping agent and mercuric acetate mixture per part by volume of the hydrocarbon mixture was used in each distillation. The distillations were all carried out at 100 mm. Hg pressure.

|  | Overhead Temp. ° C. at 100 mm. Hg | Mole Percent Sytrene in Distillate |
|---|---|---|
| Formic acid plus 6 gms. mercuric acetate | 41 | 16.4 |
| Acetic acid plus 7 gms. mercuric acetate | 58 | 24.2 |
| Propionic acid plus 10% $H_2O$ plus 29 gms. mercuric acetate | 46 | 6.3 |

The distillation column used in each distillation was a 10 tray Oldershaw column and was in each instance operated at a total take-off of the distillate.

Consideration of the above example clearly demonstrates the separation obtained from the present invention though the separation was made in a relatively low efficiency laboratory column. The three solvents containing $Hg[OAc]_2$ shown above reduced the styrene content of the xylene fraction by 68, 53 and 88%, respectively.

To further demonstrate the efficacy of the present invention the following additional examples are presented.

*Example II*

A 1:10 by volume mixture of styrene and o-xylene is distillated at 100 mm. Hg pressure in the 10 tray Oldershaw column of Example I in the presence of a solution of 80 mls. of propionic acid containing approximately 2 grams of mercuric acetate to obtain an overhead distillate. The distillate so obtained contains substantially less styrene than did the initial mixture.

*Example III*

The distillation of Example II is repeated with the exception that a 1:20 by volume mixture of styrene and o-xylene is used. The distillate obtained contains substantially less styrene than did the initial mixture.

*Example IV*

The distillation of Example II is repeated with the exception that the solvent mixture consists of 80 mls. of n-butanol containing approximately 5 grams of zinc acetate dissolved therein. The distillate obtained contains substantially less styrene than does the original mixture.

*Example V*

The distillation of Example II is repeated with the exception that a 1:10 mixture of styrene and m-xylene is used. The distillate obtained contains substantially less styrene than does the original mixture.

*Example VI*

The distillation of Example II is repeated with the exception that a 1:10 mixture of stryene and p-xylene is used. The distillate obtained contains substantially less styrene than does the original mixture.

The present invention may be used to separate a relatively wide range of organic compounds. Generally, it will be applied to the separation of vinyl aromatic hydrocarbons from alkyl aromatic hydrocarbons. The present invention, of course, finds its greatest utility in the separation of mixtures of vinyl aromatic hydrocarbons and alkyl aromatic hydrocarbons which are difficultly separable by fractional distillation. A separation for which the present invention is particularly suitable is the separation of xylenes and ethylbenzene from styrene. The xylenes may be either ortho, meta, para or any mixture thereof. Since m- and p-xylene boil approximately 6 and 7° C., respectively, lower than styrene, they may be separated from styrene to a significant extent by fractionation alone. Ethylbenzene, also, may be separated from styrene to a considerable extent by fractionation alone. However, o-xylene has a boiling point very close to that of styrene [approximately 2° C. lower] and may be separated from styrene only by highly efficient and costly fractionation. Therefore, though it is to be understood that styrene may be separated from any or all of the xylenes or ethylbenzene by the present invention, it is the separation of styrene and o-xylene for which the present invention finds its greatest utility. The ratio of the vinyl aromatic hydrocarbon to the alkyl aromatic hydrocarbons the mixture to be separated is not critical from the standpoint of operability of the present invention, but is somewhat critical from the standpoint of practicality. It is somewhat difficult in many instances to recover all of the vinyl aromatic hydrocarbons from the bottoms product of the distillation unit and therefore the present invention is less attractive commercially when relatively large quantities of such compounds are involved. Generally it is to be preferred in the practice of the present invention that there be no more than 50 mol. percent of vinyl aromatic hydrocarbon present in the mixture.

Generally in practicing the present invention, it is preferred to operate the distillation column at subatmospheric pressure though this is by no means necessary. Of course, the molecular weight of the compounds being separated will to some extent dictate the optimum pressure. A preferred pressure for distilling xylenes and/or ethylbenzene from styrene according to the preferred utility of the present invention is between 75 and 500 mm. Hg.

The azeotroping agents useful in the present invention include any of those compounds which will form azeotropes with alkyl aromatic hydrocarbons. The literature lists numerous azeotroping agents for the various alkyl aromatic hydrocarbons. Further, it is easily within the ability of those skilled in the art to determine additional azeotroping agents for any of the alkyl aromatic hydrocarbons as well as to determine those which are most efficient. Of course, in order to facilitate the formation of the solvent solution, it is preferred that the azeotrope agent be one in which the Group II-B metal salt is relatively soluble. Among the azeotroping agents useful in the practice of the present invention according to its preferred utility in separating xylenes and/or ethylbenzene from styrene and particularly o-xylene from styrene are the following non-limiting examples: Formic acid, acetic acid, propionic acid, n-butyl alcohol, iso-butyl alcohol, iso-amyl alcohol, and ethylene glycol alkyl ethers. The most useful azeotroping agents in the preferred utility of the present invention are the aliphatic acids of less than 5 carbon atoms such as formic acid, acetic acid, propionic acid, butanoic acid, and the like. Water is also a useful azeotroping agent and may be added to other azeotroping compounds to increase the solubility of the metal salt in the azeotroping agent thereby facilitating the formation of the solvent solution. The preferred azeotroping agents are aqueous and non-aqueous solutions of formic acid, acetic acid, and propionic acid.

The solvent of the present invention contains a salt of a metal from Group II-B of the periodic table. Ordinarily, the Group II-B metal salt is present in an amount of from 1 to 45% by weight. The metals within this group are mercury, zinc and cadmium. The metal salt may be either an organic or inorganic salt with the organic salts being preferred. Mercury is the preferred metal and the preferred metal salt is mercuric acetate. It is preferred that the amount of the Group II-B metal salt present in the solvent solution be within the range of from 5 to 35% by weight of the solvent solution.

A particularly preferred group of solvent mixtures are those containing 5 to 35% by weight of mercuric acetate, 5 to 15% by weight of water and the remainder an acid selected from the group consisting of formic, acetic, and propionic.

The terms "solvent solution," "solvent" and "solvent mixture" used throughout this specification refer to the combination of a salt of a metal from Group II-B of the periodic table and an alkyl aromatic hydrocarbon azeotroping agent including any diluent such as water.

The temperature in which the distillation column is operated is not particularly critical to the present invention so long as it is sufficient to produce an overhead distillate from the distillation column. The distillation column is normally operated at a temperature corresponding to the azeotropic distillation temperature of the azeotroping agent and the alkyl aromatic hydrocarbons. With most of the solvent mixtures operable in the present invention and with a distillation column of 10 to 20 tray efficiency, an overhead temperature of approximately 50 to 150° C. at 100 mm. Hg will produce the alkyl aromatic hydrocarbon rich distillate product.

This invention is not limited to any particular type of column and is operable with packed columns, tray columns, bubble cap columns or any other conventional type of distillation apparatus. The efficiency of the distillation unit may vary from a single plate efficiency to as great as a 100 or greater. The efficiency of the distillation unit will depend primarily upon the degree of separation desired and also on the particular solvent system used. The determination of the efficiency necessary to effect a given degree of separation with a particular solvent solution is readily within the ability of those skilled in the art.

I claim:

1. A process for the separation of an aromatic hydrocarbon mixture containing vinyl aromatic hydrocarbons and alkyl aromatic hydrocarbons which comprises subjecting such aromatic hydrocarbon mixture to distillation in the presence of a solvent comprised of an organic salt of a metal from Group II-B of the periodic table and an acyclic aliphatic acid of less than 5 carbon atoms, recovering from said distillation an overhead distillate containing said acyclic aliphatic acid and an alkyl aromatic hydrocarbon fraction substantially richer in alkyl aromatic hydrocarbons than the original aromatic hydrocarbon mixture, and recovering a bottoms containing said organic salt of a metal from Group II-B of the periodic table and a vinyl aromatic hydrocarbon fraction substantially richer in vinyl aromatic hydrocarbons than said original aromatic hydrocarbon mixture.

2. The process of claim 1 wherein said distillation is carried out at subatmospheric pressures.

3. The process of claim 1 wherein the vinyl aromatic hydrocarbon is styrene and the alkyl aromatic hydrocarbon is one selected from the group consisting of o-xylene, m-xylene, p-xylene, ethylbenzene and mixtures thereof.

4. The process of claim 1 wherein the amount of said organic salt in said solvent is 1 to 45 percent by weight.

5. The process of claim 1 wherein the organic salt is mercuric acetate.

6. The process of claim 1 wherein said aliphatic acid is one selected from the group consisting of formic, acetic and propionic acids.

7. The process of claim 1 wherein the solvent is one comprised of 5 to 35 percent by weight of mercuric acetate, 5 to 15 percent by weight of water and the remainder an acid selected from the group consisting of formic, acetic and propionic acids.

8. The process of claim 1 wherein the aromatic hydrocarbon mixture is one consisting essentially of styrene and o-xylene.

References Cited by the Examiner

UNITED STATES PATENTS

| | | | |
|---|---|---|---|
| 2,380,019 | 7/1945 | Bloomer | 203—53 |
| 2,381,996 | 8/1945 | Bloomer | 203—55 |
| 2,423,412 | 7/1947 | Smoker | 203—44 |
| 2,438,018 | 3/1948 | Nixon et al. | 203—20 |
| 2,445,944 | 7/1948 | Engel | 203—53 |
| 2,467,152 | 4/1949 | Ohsol et al. | 203—55 |
| 2,467,197 | 4/1949 | Engel | 203—55 |
| 2,681,306 | 6/1954 | Kemp et al. | 203—96 |
| 2,779,720 | 1/1957 | Tanona | 203—55 |

NORMAN YUDKOFF, *Primary Examiner.*

W. L. BASCOMB, JR., *Examiner.*